MERCAPTO-TERMINATED LIQUID POLY-URETHANE POLYMER

Riad H. Gobran, Levittown, Pa., Arthur Victor Tobolsky, Princeton, N.J., and Paul C. Colodny, Pittsburgh, Calif., assignors to Thiokol Chemical Corporation, Trenton, N.J., a corporation of Delaware
No Drawing. Filed June 16, 1958, Ser. No. 742,012
7 Claims. (Cl. 260—75)

This invention relates to the manufacture of polymercaptans and more particularly to a new type of mercapto-terminated polymer that can be cured by known curing technique to produce an elastomer having improved tensile strength. The invention also relates to a novel process of making such mercapto-terminated polymers.

Polythiopolymercaptan polymers curable by oxidation of their mercapto groups to form solid elastomers having important industrial applications are well known and have been extensively used commercially. Such polymers and methods of making them are disclosed, for example, in Patrick and Ferguson Patent 2,466,963 as well as in articles by Fettes and Jorczak published in "Industrial and Engineering Chemistry," volume 42, page 2217 (1950), and volume 43, page 324 (1951). As indicated in the foregoing publications polysulfide polymers of this type may be either liquid or solid depending upon their molecular weight and can be cured by a variety of oxidizing agents, at room temperature or elevated temperatures, to yield elastomers having exceptional resistance to acids, alkalis, hydrocarbon solvents and atmospheric oxidation. Moreover, the uncured polymers are stable and can be stored for long periods of time without deterioration.

While polymers of this type have been used commercially as sealants, impregnants, protective coatings, etc. in a wide variety of applications, their usefulness has been limited to some extent by the fact that they have a relatively low tensile strength. Also they have a tendency to flow at atmospheric temperatures and hence have relatively poor cold flow, creep and stress relaxation properties.

It is further known that polyurethane resins can be prepared from isocyanate-terminated polyester pre-polymers and that such resins have appreciably better tensile strength and cold flow properties than the polysulfide polymers. However, the isocyanate-terminated pre-polymers are subject to the disadvantage that they are toxic and are relatively unstable when stored for extended periods of time.

It is accordingly an object of the present invention to provide a liquid pre-polymer capable of being cured to an elastomeric polymer having the desirable tensile and cold flow properties of the polyurethane resins, which pre-polymer has the desirable stability in storage and curing versatility of the commercial liquid polysulfide polymers. It is still another object of the invention to provide a novel method of making such a polymercaptan polymer. Other objects of the invention will be in part obvious and in part pointed out hereafter.

The polymercaptan polymers of the present invention may be generally described as mercapto-terminated oxahydrocarbon polymers. The basic structure of the polymer is an oxahydrocarbon chain, which may be a polyester or polyether chain, to the ends of which mercapto radicals are connected. It has been found that the mode of attachment of the mercapto radicals to the oxahydrocarbon chain has an important bearing on the stability of the product obtained, and that products having good stability can be achieved by connecting the mercapto radicals to the basic oxahydrocarbon structure by means of thiourethane or urea links in the manner described hereafter.

Products of this type can be prepared in general by reacting hydroxyl-terminated polyester or polyether polymers with a diisocyanate to form isocyanate terminals on the oxahydrocarbon chains and then reacting the resulting diisocyanates with either mercapto-amines or dimercaptans in such manner that the amine group of the mercapto-amine or one of the sulfhydryl groups of the dimercaptan reacts with each terminal isocyanate group to form a urea or thiourethane link at each terminus of the oxahydrocarbon chain through which a sulfhydryl group is connected to the chain. The reactions that occur when a dimercaptan is used may be represented by the following equations wherein

HO—A—OH represents a hydroxyl-terminated polyether or polyester polymer, $2R(NCO)_2$ represents an organic diisocyanate and $2R'(SH)$ represents a dimercaptan:

(1) HO—A—OH+2R(NCO)$_2$→OCN—R—NH
—CO—O—A—O—CO—NH—R—NCO (2) OCN—R—NH—CO—O—A—O—CO—NH
—R—NCO+2R'(SH)$_2$→HS—R'—S—CO—NH—R
—NH—CO—O—A—O—CO—NH
—R—NH—CO—S—R'—SH

Thus the sulfhydryl groups are connected to the basic polymer structure by thiourethane links.

In cases where a mercapto-amine is used the reaction with the diisocyanate may be represented by the following equation:

(3) OCN—R—NH—CO—O—A—O—CO—NH
—R—NCO+2H$_2$NR'SH→HS—R'—NH—CO—NH
—R—NH—CO—O—A—O—CO—NH
—R—NH—CO—NH—R'—SH

When using a mercapto-amine rather than a dimercaptan it is possible for the mercapto group to react with the diisocyanate to produce amine terminals on the polymer. However the amine group is far more reactive than the mercapto group and hence only a very small number of amine terminals are formed. As illustrated in Example 7 given below, when a mercapto-amine is employed in the present process it is desirable that a small amount of a tri-hydric alcohol be used in preparing the basic polyester structure, so that even if a few amine terminals are formed by reaction of the mercapto-amine with the polyisocyanate, there will be a minimum of two free mercapto groups in the molecule through which the polymer can be cured.

A wide variety of polyester and polyether polymers, diisocyanates, dimercaptans and mercapto-amines can be used in preparing the present products. Insofar as the polyether polymers are concerned these include polyalkylene glycols wherein the alkylene groups contains from 2 to 6 carbon atoms and which have molecular weights that are preferably within the range 1000 to 6000. Such polyglycols may be for example the viscous liquid or waxy polyethylene glycols sold under the trade name "Carbowax," the polyglycols sold under the name "Pluronic L-61" and "Tetronic 701," the Dow polyglycols 11-200, 11-300 and 11-400, the Union Carbide propylene glycol 2025, and polymers of tetramethylene oxide and pentamethylene oxide such as the tetramethylene glycols sold under the trade name "Terracol."

Any of the linear polyesters that have been previously proposed for use in making polyurethane resins can be used in preparing the present products. In general the useful polyesters are those prepared by condensation of polyhydric alcohols or amino alcohols and polybasic acids. Suitable polyhydric alcohols and amino alcohols for this purpose include ethylene glycol, diethylene glycol, glycerol, sorbitol, pentaerythritol, trimethylol propane and trimethylol ethane, as well as amino alcohols such as the ethanolamines, aminopropanols and other lower aminoalkanols. Suitable polybasic acids for reacting with the foregoing alcohols to form linear polyesters include oxalic, adipic, sebacic, 6-aminocaproic, phthalic, isophthalic, terephthalic, malonic, succinic, maleic, fumaric, dimer and itaconic acids. Polyesters prepared by reaction of adipic acid with ethylene glycol and lower polyethylene glycols have been found especially satisfactory. The molecular weight of the polyester is preferably of the order of 2000 to 3000. Since a large number of polyesters have been previously proposed for reaction with polyisocyanates to form polyurethanes, it is deemed unnecessary to include a more extensive list of such polyesters in the present specification.

Similarly any of the organic polyisocyanates that have been previously proposed for the preparation of polyurethane resins may be employed in preparing the present product. Suitable polyisocyanates for use in the present process include arylene polyisocyanates such as the tolylene diisocyanates; meta-phenylene diisocyanates; 4-chloro-1, 3 phenylene diisocyanate; methylene-bis-(4-phenyl isocyanate); 1,5 naphthalene diisocyanate; 3,3'dimethoxy-4,4'-biphenylene diisocyanate; 3,3'-diphenyl-4,4'-biphenylene diisocyanate; triphenylmethane triisocyanate; and alkylene polyisocyanates such as ethylene, ethylidene, propylene-1,2-butylene 1,3; hexylene 1,6; and cyclohexylene 1,2-diisocyanates. Metatoluene diisocyanates, which are presently the diisocyanates most widely used commercially for this purpose, are entirely satisfactory for preparing the present product. A commercial mixture consisting of about 80% of the 2,4 isomer and 20% of the 2,6 isomer sold under the trade name Hylene T M may be advantageously used.

In cases where the diisocyanate is reacted with a dimercaptan, any desired dimercaptan may be used. Thus a relatively simple dimercaptan such as ethane dithiol or bis-beta-mercapto-ethyl sulfide may be used or the dimercaptan may itself be a low molecular weight polymer of the type disclosed in Patrick et al. Patent 2,466,963 referred to above. If mercaptan polymers of this type are used they are preferably liquid polymers of relatively low viscosity having molecular weights of the order of 500 to 1500. Suitable polymers of this type are further described in the specific examples given hereafter.

In general, any mercapto-amine can be used, although for economic reasons the simpler mercapto-alkylamines such as mercapto-ethylamine, 3-mercapto-propylamine, mercaptoisopropylamine and 4-mercapto-butylamine are preferred.

In order to point out more fully the nature of the present invention the following examples are given of illustrative methods of preparing the products of the invention.

EXAMPLE 1

In this example a mercapto-terminated polymer was prepared by using as a starting material a polyester which comprised two parts by weight of a linear condensation product of triethylene glycol and adipic acid and one part by weight of a linear condensation product of ethylene glycol and adipic acid. This polyester mixture had a molecular weight of about 2000–3000, an isocyanate equivalent weight of about 1000–1500 and an acid number of 2. The polyester mixture was dried by heating for 4 hours at 120° to 130° C. while a stream of nitrogen was bubbled therethrough. It was then reacted with 2,4-toluene diisocyanate which analyzed 95% diisocyanate and 5% inert matter.

More particularly a prepolymer was prepared by reacting 355 grams (2.04 mols) of the diisocyanate with 2410 grams (1.85 isocyanate equivalent weights) of the polyester at room temperature and maintaining the mixture under an atmosphere of dry nitrogen for 72 hours. The proportions of reactants were such as to provide approximately 10% excess of the diisocyanate. The isocyanate content of the resulting prepolymer was found to be 2.67% which corresponds to an equivalent weight of 1570.

This prepolymer was reacted with a 10% molar excess of ethanedithiol. Specifically 182 grams (1.94 mols) of ethanedithiol was reacted with 2765 grams (1.76 equivalent weights) of prepolymer in the presence of one ml. of N-methyl-2-pyrrolidone as a catalyst. The reaction was carried out by heating the reaction mixture at 70° C. The extent of the reaction was followed by observing the disappearance of the isocyanate absorption band in the infra-red spectrum and it was found that the reaction could be carried substantially to completeness within a period of 1 to 2 hours. The viscosity of the resulting mercapto-terminated polymer was about 25,000 centipoises at 30° C.

Two samples of this polymer, designated A and B, were cured in the following manner: In curing sample A 60 parts by weight of the polymer were mixed with 0.8 part by weight of magnesium oxide and 0.5 part by weight of stearic acid and thoroughly blended by three passes through a three-roll paint mill; 5 parts of tertiary butyl-hydroperoxide were then mixed in, and the resulting mixture deaerated and poured into a sample mold. Curing was effected at room temperature with a curing time of about 4 hours.

Sample B was cured in the same way as Sample A except that 30 parts of carbon black was blended with the polymer mixture prior to addition to the tertiary butyl hydroperoxide thereto. The tensile strength and modulus of elasticity at 200% elongation were determined for each sample and are given in Table I below. For purposes of comparison corresponding values are also given for a non-reinforced and carbon black reinforced liquid polysulfide polymer of the conventional type cured in the same way as described above in connection with samples A and B:

*Table I*

| Polymer | Tensile Strength (p.s.i.) | Elastic Modulus (200%) |
|---|---|---|
| Sample A | 630 | 264 |
| Sample B | 2,285 | 985 |
| Non-reinforced liquid poly-sulfide polymer | 150 | 150 |
| Carbon-black-reinforced polysulfide polymer | 450 | 250 |

From the foregoing table it is apparent that the tensile strengths of samples A and B were from 4 to 6 times as great as the tensile strengths of similarly treated polysulfide liquid polymers and that the elastic moduli of samples A and B were substantially greater than those of the similarly cured polysulfide polymers.

EXAMPLE 2

The polyester used was the same as that of Example 1. A prepolymer was prepared by the reaction of 2700 grams (2.08 isocyanate equivalent weights) of this polyester with 398 grams (2.29 mols) of 2,4-toluene diisocyanate under the same conditions as in Example 1. This prepolymer analyzed 2.79% isocyanate and thus had an isocyanate equivalent weight of 1510.

The resulting diisocyanate was reacted with bis-beta-mercapto ethyl sulfide under the conditions described in Example 1. Specifically, 1000 grams (0.662 equivalent) of the prepolymer was reacted with 112 grams (0.728 mol) of the dimercaptan to yield a mercapto-terminated polymer. This polymer was cured like sample A of Example 1 with the proportions of curing ingredients being the same. The tensile strength of the cured polymer was 611 p.s.i. and its elastic modulus at 200% elongation was 240.

EXAMPLE 3

An isocyanate-terminated prepolymer was prepared in the general manner as described in Example 1 and reacted with a liquid polysulfide polymer having the approximate structural formula

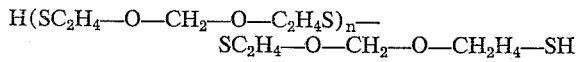

wherein the average value of $n$ is between 3 and 4. The molecular weight of this polymer was of the order of 650–850.

The prepolymer of this example was prepared from the polyester of Example 1 by reacting 1880 grams (1.45 equivalents) of the polyester with 2.77 grams (1.59 equivalents) of 2,4-toluene diisocyanate to yield a prepolymer having 2.78% isocyanate and an isocyanate equivalent weight of 1510. This prepolymer was then reacted with 965 grams (1.50 equivalents) of the liquid polysulfide polymer under the conditions described in Example 1 to yield a mercapto-terminated polymer.

As in Example 1 two samples of the polymer, designated C and D, where cured in accordance with slightly different formulas. Sample C was cured by mixing 60 parts of the polymer with 0.8 part of magnesium oxide, 0.5 part of stearic acid and 5 parts of tertiarybutyl hydroperoxide. Sample D was cured by mixing 60 parts of polymer with the same amounts of magnesium oxide, stearic acid and tertiarybutyl hydroperoxide plus 30 parts of carbon black. The tensile strength of sample C was 228 p.s.i. and its modulus at 200% elongation was 192. The tensile strength of the carbon-black-reinforced sample D was 1510 p.s.i. and its modulus was 780.

EXAMPLE 4

In this example a prepolymer was used which is sold under the trade name Adiprene L and is the reaction product, having reactive isocyanate terminals, of polytetramethylene ether glycol and toluene diisocyanate, prepared as disclosed in French Patent No. 1,065,377, published May 24, 1954. 210 grams of this polymer (about 0.1 mol) was reacted with 32.6 grams ethanedithiol. The dimercaptan was added to the prepolymer at 80°–90° C. over a period of several minutes, and the mixture was heated at 120° C. for four hours, then cooled. Analysis showed the resulting product to be substantially free of isocyanate groups and to contain 5.8% SH.

This product was cured at room temperature by mixing 11.4 parts by weight of the product with 3.58 parts of lead peroxide, 3.22 parts of dibutyl peroxide and 0.36 part of stearic acid. A cure to a rubbery solid was effected in about one hour.

EXAMPLE 5

The same quantity of the prepolymer of Example 4, i.e. 210 grams, was reacted with 23.3 grams of ethanedithiol as described in Example 4. The resulting mercapto polymer analyzed 4.1% SH and was cured as in Example 4. Curing of the polymer was effected at room temperature in one hour and 20 minutes.

EXAMPLE 6

In this example a mercapto-terminated polymer was prepared by using as a starting material a linear polyester prepared in the following manner from 10 mols (1060 g.) of diethylene glycol and 9 mols (1314 g.) of adipic acid. The glycol and adipic acid were mixed in a reaction flask equipped with a continuous agitator, a quantity of xylene equal to about 5% by weight of the reactants (118 g.) was added and nitrogen was bubbled through the reaction mixture. The temperature was raised to 160° C. and the azeotropic mixture of xylene and water formed in the reaction was collected. The xylene was automatically returned to the flask, the water separated. After about 60% (200 ml.) of the theoretical amount of water had been removed, the temperature was raised gradually to about 225° C. Azeotropic distillation was continued until all of the theoretical amount (324 g.) of water had been removed.

The total amount of water obtained was somewhat greater than the theoretical, presumably because the glycol used was not completely dry. At the end of the reaction, xylene was removed by use of a slight vacuum. The linear polyester obtained had an acid number of about 3, and an isocyanate equivalent of about 1000.

The polyester obtained, about 2050 g., was reacted with 400 g. (2.10 mols) of 2,4-toluene diisocyanate at room temperature for 72 hours, under an atmosphere of nitrogen. There was approximately 10% excess of diisocyanate.

The prepolymer thus prepared had an isocyanate content of about 3.3%. It was reacted with a 10% excess of ethane dithiol. 2.1 mols (192 g.) of $HSC_2H_4SH$ was added in the presence of one ml. of N-methyl-2-pyrrolidone as a catalyst. The reaction was completed by heating the reaction mixture at 70° C. The reaction could be followed by watching the disappearance of the isocyanate absorption band in the infra-red. This required about two hours. The resulting mercapto-terminated polymer had a viscosity about 20,000 poises at 30° C.

EXAMPLE 7

As has been previously indicated, mercapto-amines may be substituted for the dimercaptans of the preceding examples. To illustrate the reaction when using a mercapto-amine, the following example is given wherein an essentially linear polyester with a small number of branch chains was prepared by mixing the following ingredients in the indicated amounts:

|  | G. | Mols |
| --- | --- | --- |
| Diethylene glycol | 1,033 | 9.75 |
| Trimethylol propane | 24 | 0.18 |
| Adipic acid | 1,314 | 9.0 |
| Xylene | 118 |  |

The reagents were esterified by azeotropic removal of water at 160° C. The polyester, which was of higher viscosity than the linear polymer of the previous example, was converted to an isocyanate-terminated prepolymer using a 10% excess of 2.4-toluene diisocyanate under a nitrogen atmosphere as in the preceding example.

The prepolymer as thus prepared was reacted with a 10% excess of mercapto-ethylamine. More particularly, 2.1 mols (160 g.) of $H_2NC_2H_4SH$ were added and allowed to react in the presence of 1 ml. of N-methyl-2-pyrrolidone at about 70° C., as before. A stable mercapto-terminated polymer was obtained.

It is of course to be understood that the foregoing examples are illustrative only and that numerous changes can be made in the ingredients, proportions and conditions disclosed therein without departing from the spirit of the invention as defined in the appended claims.

We claim:

1. The method of making a liquid mercapto-terminated polymer curable by oxidation to an elastomer having improved tensile properties, which comprises reacting a linear hydroxy-terminated polyester polymer having a molecular weight of about 2000 to 3000 with an excess of an organic diisocyanate to form substantially all isocyanate terminals on said polymer, and then reacting the resulting isocyanate-terminated polymer with an organic mercaptan selected from the group consisting of polymercaptans and monomercapto-amines in the presence of N-methyl-2-pyrolidone as a catalyst to produce a mercapto-terminated liquid polymer, said isocyanate-terminated polymer and organic mercaptan being reacted in such proportions that the ratio of the total of —$NH_2$ and —SH groups present in the organic mercaptan to the —NCO groups present in the isocyanate-terminated polymer is about 2:1.

2. A method according to claim 1 and wherein a polymercaptan is used which is ethane dithiol.

3. A method according to claim 1 and wherein a polymercaptan is used which is bis-beta-mercaptoethyl sulfide.

4. A method according to claim 1 and wherein a polymercaptan is used which is a polythiopolymercaptan having a molecular weight of approximately 500–1500.

5. A method according to claim 1 and wherein a monomercapto-amine is used which is mercapto-ethylamine.

6. A stable liqid prepolymer product consisting essentially of a mixture of mercapto-terminated polymers of the formula

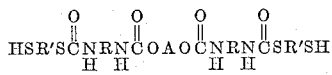

wherein —OAO— is the radical of a linear hydroxy terminated polyester polymer with the hydrogen atoms of the terminal hydroxy groups removed, R is a radical selected from the group consisting of arylene and alkylene radicals and is derived from an organic di-isocyanate R(NCO)$_2$, reacted with said hydroxy terminated polyester polymer, and R' is an alkylene polysulfide radical.

7. A stable liqid prepolymer product as in claim 6 wherein R' is obtained by removing the terminal SH groups of a polythiopolymercaptan having the structural formula $$H(SC_2H_4-O-CH_2-O-C_2H_4S)_n$$
$$-SC_2H_4-O-CH_2-O-C_2H_4-SH$$

where $n$ is an integer such that said polythiomercaptan has a molecular weight of between 500 and 1500.

References Cited in the file of this patent

UNITED STATES PATENTS

| | | |
|---|---|---|
| 2,466,963 | Patrick et al. | Apr. 12, 1949 |
| 2,843,568 | Benning et al. | July 15, 1958 |
| 2,867,278 | Mallory et al. | Jan. 6, 1959 |
| 2,877,192 | Burkus | Mar. 10, 1959 |
| 2,907,745 | Greenlee | Oct. 6, 1959 |
| 2,917,486 | Nelson et al. | Dec. 15, 1959 |
| 2,929,800 | Hill | Mar. 22, 1960 |

FOREIGN PATENTS

| | | |
|---|---|---|
| 558,653 | Canada | June 10, 1958 |
| 68,857 | France | Feb. 10, 1958 |
| 1,065,377 | France | Feb. 10, 1958 |
| 1,007,993 | Germany | May 9, 1957 |
| 90,002 | Norway | Sept. 16, 1957 |

OTHER REFERENCES

Muller et al.: Agnew. Chem., 64, No. 19/20 (1952). (Copy in Scientifiec Library.)